United States Patent
Okada et al.

(10) Patent No.: US 10,833,346 B2
(45) Date of Patent: Nov. 10, 2020

(54) FLOW BATTERY

(71) Applicant: Panasonic Intellectual Property Management Co., Ltd., Osaka (JP)

(72) Inventors: Yuka Okada, Hyogo (JP); Shinji Ando, Osaka (JP); Sho Shibata, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 41 days.

(21) Appl. No.: 16/418,350

(22) Filed: May 21, 2019

(65) Prior Publication Data

US 2019/0356010 A1   Nov. 21, 2019

Related U.S. Application Data (63) Continuation of application No. PCT/JP2018/048560, filed on Dec. 28, 2018.

(30) Foreign Application Priority Data

May 17, 2018 (JP) ................................. 2018-095701

(51) Int. Cl.
*H01M 8/18* (2006.01)
*H01M 8/0221* (2016.01)
*H01M 8/04186* (2016.01)

(52) U.S. Cl.
CPC ......... *H01M 8/188* (2013.01); *H01M 8/0221* (2013.01); *H01M 8/04186* (2013.01)

(58) Field of Classification Search
CPC .................................................... H01M 8/188
See application file for complete search history.

(56) References Cited

U.S. PATENT DOCUMENTS

2014/0178735 A1   6/2014 Wang et al.
2018/0048004 A1*  2/2018 Hojo ................. H01M 8/04283
(Continued)

FOREIGN PATENT DOCUMENTS

JP   2013-218868   10/2013
JP   2014-524124    9/2014
(Continued)

OTHER PUBLICATIONS

Di Vona, High ionic exchange capacity polyphenylsulfone (SPPSU) and polyethersulfone (SPES) cross-linked by annealing treatment: Thermal stability, hydration level, Elsevier (Year: 2010).*
(Continued)

*Primary Examiner* — Brian R Ohara
(74) *Attorney, Agent, or Firm* — McDermott Will & Emery LLP (57) ABSTRACT

The flow battery according to the present disclosure comprises a first non-aqueous liquid, a first electrode in contact with the first non-aqueous liquid, a second electrode which serves as a counter electrode of the first electrode, and a lithium ion conductive film which separates the first electrode and the second electrode from each other. The lithium ion conductive film is formed of a polymer base material containing an ionic polymer. The polymer base material has an interspace which communicates with an outside thereof. The polymer base material is formed of at least one kind of resin selected from the group consisting of a thermosetting resin and a thermoplastic resin which has a melting point of not less than 150 degrees Celsius. The ionic polymer is contained in an inside of the interspace of the polymer base material. The ionic polymer is represented by (Continued)

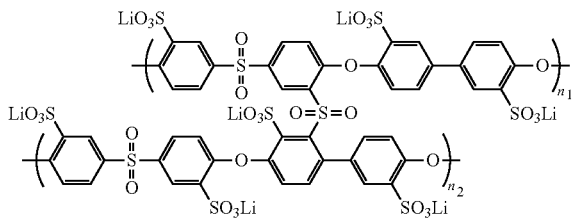

where n1 and n2 are, each independently, natural numbers of not less than 1, or

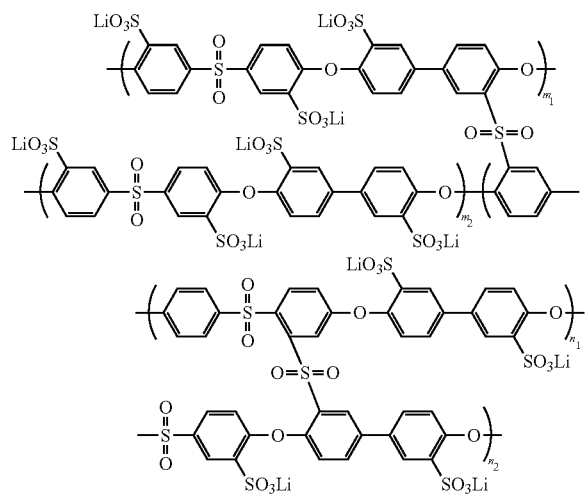

where m1, m2, n1, and n2 are, each independently, natural numbers of not less than 1. The flexible lithium ion conductive film having a low swelling property when in contact with a non-aqueous liquid.

9 Claims, 4 Drawing Sheets

(56) References Cited

U.S. PATENT DOCUMENTS

2018/0198149 A1  7/2018  Kim et al.
2019/0189987 A1* 6/2019  Yang .................... H01M 2/145

FOREIGN PATENT DOCUMENTS

WO      2016/208123       12/2016
WO      WO-2016208123 A1 * 12/2016 ........ H01M 8/04283

OTHER PUBLICATIONS

Search (Year: 2020).*
International Search Report of PCT application No. PCT/JP2018/048560 dated Feb. 5, 2019.

* cited by examiner

FLOW BATTERY

BACKGROUND

1. Technical Field

The present disclosure relates to a flow battery.

2. Description of the Related Art

Patent Literature 1 discloses a redox flow battery system comprising an energy reservoir containing a redox mediator. Patent Literature 2 discloses a flow battery using a redox material. Patent Literature 3 discloses an ion exchange membrane and a method for producing the same, a redox flow battery, and a fuel cell. Patent Literature 4 discloses a polyphenylsulfone proton-conductive polymer electrolyte.

CITATION LIST

Patent Literature

Patent Literature 1: United States Patent Application Publication No. 2014/0178735
Patent Literature 2: United States Patent Application Publication No. 2018/0048004
Patent Literature 3: Japanese Patent Application Publication No. 2013-218868
Patent Literature 4: United States Patent Application Publication No. 2018/0198149

SUMMARY

An object of the present disclosure is to provide a flow battery comprising a flexible lithium ion conductive film having a low swelling property when in contact with a non-aqueous liquid.

The flow battery according to the present invention comprises:
a first non-aqueous liquid;
a first electrode in contact with the first non-aqueous liquid;
a second electrode which serves as a counter electrode of the first electrode; and
a lithium ion conductive film which separates the first electrode and the second electrode from each other,
wherein
the lithium ion conductive film is formed of a polymer base material containing an ionic polymer;
the polymer base material has an interspace which communicates with an outside thereof;
the polymer base material is formed of at least one kind of resin selected from the group consisting of a thermosetting resin and a thermoplastic resin which has a melting point of not less than 150 degrees Celsius;
the ionic polymer is contained in an inside of the interspace of the polymer base material; and
the ionic polymer is represented by

[Chem. 1]

where $n_1$ and $n_2$ are, each independently, natural numbers of not less than 1, or

[Chem. 2]

where $m_1$, $m_2$, $n_1$, and $n_2$ are, each independently, natural numbers of not less than 1.

The present disclosure provides a flow battery comprising a flexible lithium ion conductive film having a low swelling property when in contact with a non-aqueous liquid.

DETAILED DESCRIPTION OF THE EMBODIMENT (Findings which Established the Foundation of the Present Disclosure)

A metal ion conductive inorganic solid electrolyte film used as a separation film of a non-aqueous flow battery does not have flexibility. For this reason, cracks occur easily in the electrolyte film. As a result, it is difficult to increase an area of the electrolyte film and to decrease the thickness of the electrolyte film. A flexible polymer solid electrolyte film which is used as the separation film of the non-aqueous flow battery is dissolved or swelled in a liquid electrolyte of the non-aqueous flow battery. For this reason, the electrolyte film which is used as the separation film has poor mechanical strength. As a result, the non-aqueous flow battery has significantly low charge-discharge property. The present disclosure provides a flow battery comprising a flexible lithium ion conductive film having a low swelling property when in contact with a non-aqueous liquid.

Hereinafter, the embodiments of the present disclosure will be described with reference to the drawings.

First Embodiment

Figure 1:
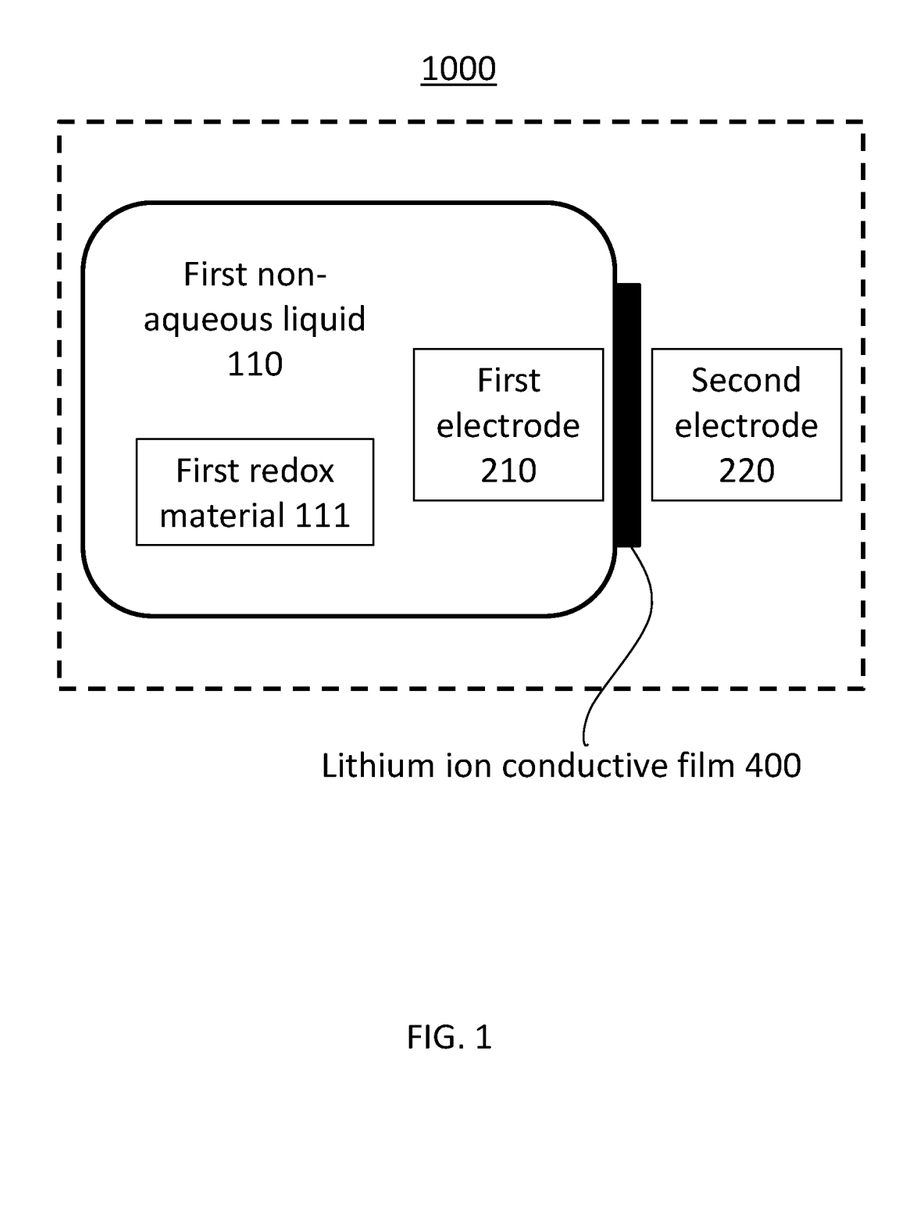
FIG. 1 shows a block diagram of a flow battery according to the first embodiment.

FIG. 1 shows a block diagram of a flow battery 1000 according to the first embodiment.

The flow battery 1000 according to the first embodiment comprises a first non-aqueous liquid 110, a first electrode 210, a second electrode 220, and a lithium ion conductive film 400.

The first non-aqueous liquid 110 is a liquid electrolyte in which a first redox material 111 is dissolved in a first non-aqueous solvent.

The first electrode 210 is in contact with the first non-aqueous liquid 110. The second electrode 220 serves as a counter electrode of the first electrode 210.

The lithium ion conductive film 400 separates the first electrode 210 and the second electrode 220 from each other.

The lithium ion conductive film 400 is formed of a polymer base material containing an ionic polymer (namely, a metal ion conductor).

The polymer base material is formed of one or more kinds of resin selected from the group consisting of a thermosetting resin and a thermoplastic resin which has a melting point of not less than 150 degrees Celsius. The polymer base material has an interspace which communicates with the outside thereof. The ionic polymer is represented by the following chemical formula (I) or (II).

(Chemical formula (I))

[Chem. 3]

(where n1 and n2 are, each independently, natural numbers of not less than 1)

(Chemical formula (II))

[Chem. 4]

(where m1, m2, n1, and n2 are, each independently, natural numbers of not less than 1)

The inside of the interspace of the polymer base material is filled with the ionic polymer. In other words, the ionic polymer is held in the inside of the interspace. In this way, lithium ion conductivity derived from the ionic polymer is ensured, and the mechanical strength sufficient for the use as the lithium ion conductive film included in the flow battery is provided.

Since the ionic polymer is acidic, the polymer base material containing the ionic polymer is required to have acid resistance. On the other hand, the polymer base material is required to have alkali resistance, in a case where ion exchange (i.e. ion exchange between the hydrogen ion of the sulfo group —$SO_3H$ and a lithium ion) is performed with a lithium hydroxide aqueous solution to incorporate lithium ions into the ionic polymer.

A method of filling the interspace of the polymer base material with the ionic polymer may comprise (i) impregnating the polymer base material with a solvent in which the ionic polymer is dissolved in a aprotic polar solvent and (ii) removing the aprotic polar solvent from the polymer base material. On the other hand, generally, since the aprotic polar solvent has high boiling point, the polymer base material impregnated with the aprotic polar solvent is required to be poorly swelled and poorly deteriorate, even when the polymer base material is heated. In other words, the polymer base material is required to have thermostability.

Since thermal crosslinking reaction in which the ionic polymer is heated to be crosslinked proceeds at high temperature of not less than 150 degrees Celsius, the polymer base material is required to have higher thermostability. An example of the aprotic polar solvent is dimethyl sulfoxide (hereinafter, referred to as "DMSO"), N, N'-dimethylformamide (hereinafter, referred to as "DMF"), N, N'-dimethylacetamide (hereinafter, referred to as "DMAC"), acetonitrile (hereinafter, referred to as "AN"), or N-methyl-2-pyrrolidone (hereinafter, referred to as "NMP").

From the above viewpoint, the polymer base material is formed of one or more kinds of resin selected from the group consisting of a thermosetting resin and a thermoplastic resin which has a melting point of not less than 150 degrees Celsius. The polymer base material contains the resin as the main component thereof. Since the main component of the polymer base material is the thermosetting resin and the thermoplastic resin which has a melting point of not less than 150 degrees Celsius, the lithium ion conductive film 400 is provided with appropriate flexibility. As a result, it is easy to significantly increase an area of the lithium ion conductive film 400. In addition, the mechanical strength of the lithium ion conductive film 400 is improved to decrease the thickness of the lithium ion conductive film 400. As a result, the lithium ion conductivity is improved. Since the flow battery 1000 according to the present disclosure comprises such a lithium ion conductive film 400, the flow battery 1000 according to the first embodiment has high output.

Generally, since the thermosetting resin and the thermoplastic resin which has a melting point of not less than 150 degrees Celsius have an electrical insulation property, the resin has no adverse effect (e.g., electric short) to the charge-discharge property of the flow battery.

The thermosetting resin may be aromatic polyimide synthesized by imidization of a polyamic acid precursor in view of (i) durability with regard to acid and alkali used for the formation of the lithium ion conductive film 400 and (ii) easiness of the formation of the lithium ion conductive film 400. The thermosetting resin may be aromatic polyimide which does not have a fluorine atom in view of (i) insolubility in the aprotic polar solvent during the formation of the lithium ion conductive film 400, (ii) resistance with regard to the oxidation—reduction during the operation of the flow battery, and (iii) insolubility in the first non-aqueous liquid 110.

An example of the thermoplastic resin which has a melting point of not less than 150 degrees Celsius may be polyphenylene sulfide, a liquid crystal polymer, polysulfone, polyethersulfone, polyphenylsulfone, polyetheretherketone, or polyetherimide. Two or more kinds of these thermoplastic resins may be used in combination. The thermoplastic resin which has a melting point of not less than 150 degrees Celsius may be polyphenylene sulfide or a liquid crystal polymer in view of (i) durability with regard to acid, alkali, and the aprotic polar solvent during the formation of the lithium ion conductive film 400, (ii) insolubility in the first non-aqueous liquid, (iii) the resistance with regard to the oxidation—reduction during the operation of the flow battery, and (iv) the easiness of the formation of the lithium ion conductive film 400.

An example of the shape of the polymer base material is a porous film, a non-woven fabric, or a mesh. Two or more shapes may be employed. The size and the shape of the interspace is not limited, as long as the interspace communicates with the outside thereof and holds the ionic polymer. The interspace may be a through-hole.

In the flow battery 1000 according to the first embodiment, the ionic polymer has a cross-linking structure.

As one example, a method of cross-linking comprises:

(a) impregnating the polymer base material having the interspace which communicates with the outside thereof with the aprotic polar solvent of the ionic polymer including an aromatic ring not having a cross-linking structure and having a sulfonate group to provide a precursor, and (b) heating the precursor.

As mentioned above, the ionic polymer is represented by the chemical formula (I) or the chemical formula (II).

In the chemical formula (I) and the chemical formula (II), m1, m2, n1, and n2 represent the numbers of repeat units. Each of the maximum values m1, m2, n1, and n2 is not limited. In the chemical formula (IV), a ratio of (m1+m2) to (m1+m2+n1+n2) is not limited. As one example, the ratio may be not less than 0.05, not less than 0.1, not less than 0.2, not less than 0.4, or not less than 0.6.

Hereinafter, the present inventors will describe a mechanism of the lithium ion conductivity of the ionic polymer represented by the chemical formula (I) or (II). A $SO_3Li$ group included in the ionic polymer serves as an exchange site of a lithium ion. A solvated lithium ion migrates through a plurality of the $SO_3Li$ groups. Ion exchange capacity of a metal ion is raised to improve the conductivity of the ionic polymer. However, a metal ion conductive film is swelled or dissolved in a polar solvent. As a result, mechanical strength of the metal ion conductive film is lowered.

The lithium ion conductive film in which the polymer base material having the interspace which communicates with the outside thereof has been filled with the ionic polymer represented by the chemical formula (I) or (II) has the sufficient mechanical strength as the lithium ion conductive film 400 of the flow battery. The lithium ion conductive film achieves high ion exchange capacity. The increase in the ion exchange site due to the increase in the ion exchange capacity improves the conductivity of the ionic polymer.

The ion exchange capacity of the ionic polymer is not limited. As one example, the ion exchange capacity may be not less than 2.5 meq/g, not less than 3.5 meq/g, or not less than 4.5 meq/g.

The flow battery 1000 according to the first embodiment has a large charging capacity and maintains the charge-discharge property for a long time.

As set forth above, the lithium ion conductive film 400 is poorly swelled, when in contact with the first non-aqueous liquid 110. Also, lithium ions travel through the lithium ion conductive film 400, when the lithium ion conductive film 400 is in contact with the first non-aqueous liquid 110. In this way, the range of choice of the first non-aqueous liquid 110 and the first redox material 111 is expanded. Accordingly, control range of charge potential and discharge potential is expanded to raise the charge capacity.

In addition, since the lithium ion conductive film 400 has flexibility and appropriate mechanical strength, it is easy to increase an area of the lithium ion conductive film 400 and to decrease the thickness of the lithium ion conductive film 400. For this reason, the flow battery 1000 according to the first embodiment has large capacity and quick charge-discharge rate.

The thickness of the lithium ion conductive film 400 is not limited. In view of the mechanical strength and the lithium ion conductivity, the lithium ion conductive film 400 may have a thickness of not less than 1 micrometer and not more than 200 micrometers, not less than 1 micrometer and not more than 50 micrometers, or not less than 5 micrometers and not more than 30 micrometers.

The first non-aqueous liquid 110 used in the flow battery 1000 according to the first embodiment may contain a compound having either a carbonate group or an ether bond as a solvent. The solvent may have high dielectric constant, poor reactivity with regard to lithium ions, and a potential window of not more than 4 volts.

An example of the compound having a carbonate group is propylene carbonate (hereinafter, referred to as "PC"), ethylene carbonate (hereinafter, referred to as "EC"), dimethyl carbonate (hereinafter, referred to as "DMC"), ethyl methyl carbonate (hereinafter, referred to as "EMC"), or diethyl carbonate (hereinafter, referred to as "DEC").

An example of the compound having an ether bond is dimethoxyethane, diethoxyethane, dibutoxyethane, diglyme (i.e., diethylene glycol dimethyl ether), triglyme (i.e., triethylene glycol dimethyl ether), tetraglyme (i.e., tetraethylene glycol dimethyl ether), tetrahydrofuran, 2-methyltetrahydrofuran, 2,5-dimethyltetrahydrofuran, 1,3-dioxolane, or 4-methyl-1,3-dioxolane.

The first non-aqueous liquid 110 may contain an electrolyte as a solute. An example of the electrolyte is $LiBF_4$, $LiPF_6$, LiTFSI, LiFSI, $LiCF_3SO_3$, or $LiClO_4$.

The first redox material 111 used in the flow battery 1000 according to the first embodiment is dissolved in the first non-aqueous liquid 110. The first redox material 111 is oxidized or reduced electrochemically in the first non-aqueous liquid 110.

An example of the first redox material 111 is:

(i) polyvalent metal ions such as vanadium ions, iron ions, or chromium ions;

(ii) metal complex ions;

(iii) heterocyclic compound such as a tetrathiafulvalene derivative, a bipyridyl derivative, a thiophene derivative, a thianthrene derivative, a carbazole derivative, or a phenanthroline;

(iv) oxocarbon;

(v) aromatic ketone such as benzophenone or acetophenone;

(vi) an aromatic compound such as biphenyl, phenanthrene, stilbene, triphenylene, o-terphenyl, m-terphenyl, or p-terphenyl; or (vii) a metallocene compound such as ferrocene.

Two or more kinds of first redox material 111 may be used in combination.

The first electrode 210 may be a cathode and the second electrode 220 may be an anode.

If the second electrode 220 is an electrode having relatively high electric potential, the first electrode 210 may be an anode.

In other words, the first electrode 210 may be an anode and the second electrode 220 may be a cathode.

When the first redox material 111 contained in the first non-aqueous liquid 110 is brought into contact with the first electrode 210, the first redox material 111 is oxidized or reduced on the first electrode 210.

The first electrode 210 may have a surface on which the first redox material 111 reacts.

If the first electrode 210 has a surface on which the first redox material 111 reacts, a material stable with regard to the first non-aqueous liquid 110 is used for the first electrode 210. The material stable with regard to the first non-aqueous liquid 110 may be a material insoluble in the first non-aqueous liquid 110. Furthermore, a material stable with regard to electrochemical reaction generated on the surface of the first electrode 210 may be used for the first electrode 210. An example of such a material is metal or carbon. An example of the metal is stainless steel, iron, copper, or nickel.

The first electrode 210 may have a structure which increases the surface area thereof. An example of the structure which increases the surface area is a mesh, a non-woven fabric, a surface roughened plate, or a sintered porous material. In this way, the specific surface area of the first electrode 210 is increased. As a result, oxidation reaction or reduction reaction of the first redox material 111 proceeds more easily.

The second electrode 220 may have a current collector and an active material which is provided on the current collector. An active material having a high capacity may be used.

As the active material of the second electrode 220, a compound having a property of reversibly storing and releasing lithium ions may be used.

The second electrode 220 may be a lithium metal. If the lithium metal is used as the second electrode 220, high capacity is achieved.

(Explanation of Charge-Discharge Process)

Hereinafter, one example of operation of charge-discharge process of the flow battery 1000 according to the first embodiment will be described.

The first electrode 210 is a cathode and formed of carbon black.

The first non-aqueous liquid 110 is an ether solution in which the first redox material 111 has been dissolved.

The first redox material 111 is benzophenone (hereinafter, referred to as "BP").

The second electrode 220 is an anode and formed of a lithium metal.

(Explanation of Charge Process)

First, the charge reaction will be described.

A voltage is applied between the first electrode 210 and the second electrode 220 to charge the flow battery 1000.

(Reaction of Anode)

Due to the application of the voltage, electrons are supplied from the outside of the flow battery 1000 to the second electrode 220, which serves as the anode. As a result, reduction reaction occurs on the second electrode 220 which serves as the anode.

The following reaction occurs on the anode.

$$Li^+ + e^- \rightarrow Li$$

(Reaction of Cathode)

Due to the application of the voltage, oxidation reaction of the first redox material 111 occurs on the first electrode 210, which serves as the cathode. In other words, the first redox material 111 is oxidized on the surface of the first electrode 210. In this way, electrons are released from the first electrode 210 to the outside of the flow battery 1000.

The following reaction occurs on the cathode.

$$BP \cdot Li \rightarrow BP + Li^+ + e^-$$

The above reactions may proceed until all of the first redox material 111 is reduced or until all of the lithium ions are converted into lithium metal.

(Explanation of Discharge Process)

Next, the discharge reaction will be described.

In the discharge reaction, electric power is taken out from first electrode 210 and the second electrode 220.

(Reaction of Anode)

Oxidation reaction occurs on the second electrode 220, which serves as the anode. In this way, electrons are released from the second electrode 220 to the outside of the flow battery 1000.

The following reaction occurs on the anode.

$$Li \rightarrow Li^+ + e^-$$

(Reaction of Cathode)

Due to discharge of the flow battery 1000, electrons are supplied from the outside of the flow battery 1000 to the first electrode 210, which serves as the cathode. In this way, the first redox material 111 is reduced on the surface of the first electrode 210.

The following reaction occurs on the cathode.

$$BP + Li^+ + e^- \rightarrow BP \cdot Li$$

A part of the lithium ions are supplied from the second electrode 220 through the lithium ion conductive film 400

The above discharge reaction may proceed until all of the first redox material 111 is reduced or until all of the lithium metal contained in the second electrode 220 are converted into lithium ions.

Second Embodiment

Hereinafter, the second embodiment of the present disclosure will be described. The matters which have already been set forth in the first embodiment will be omitted appropriately.

Figure 2:
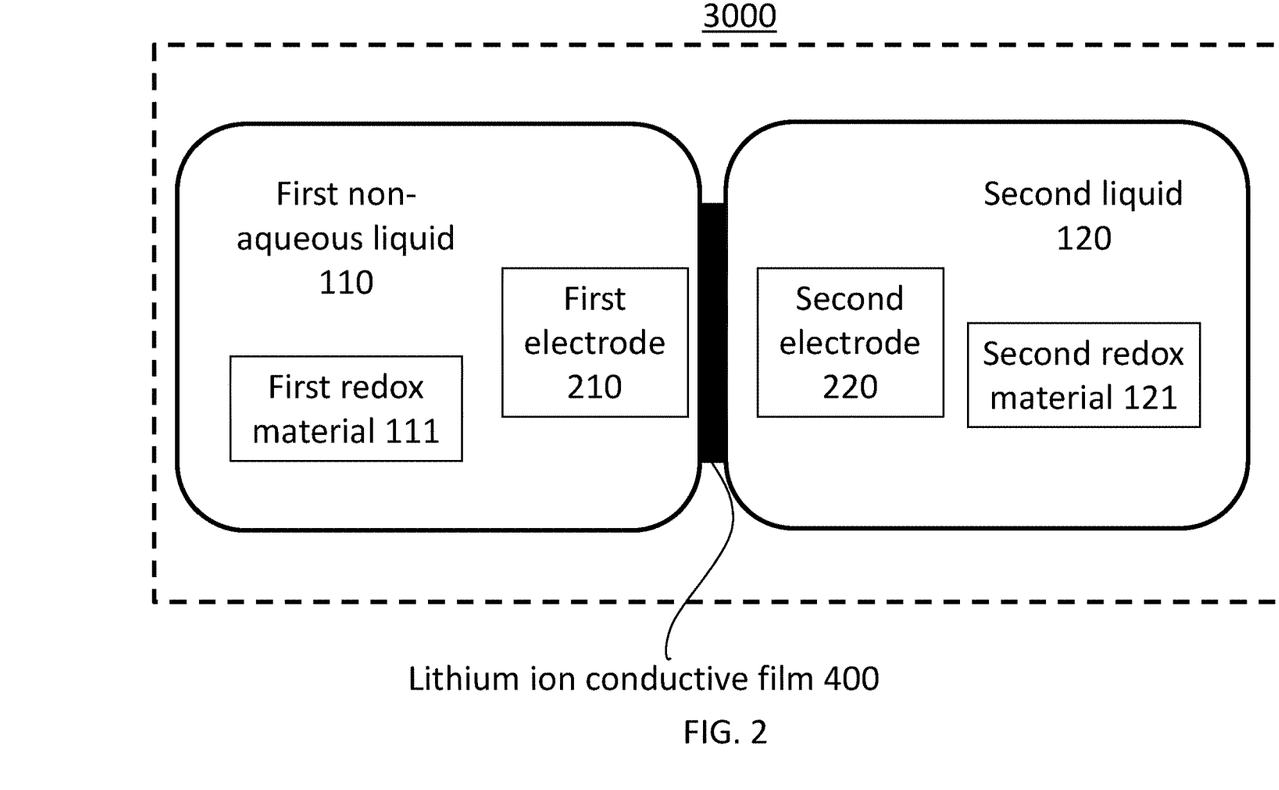
FIG. 2 shows a block diagram of a flow battery according to the second embodiment.

In the second embodiment, the first non-aqueous liquid 110 and a second liquid 120 are circulated at the sides of the first electrode 210 and the second electrode 220, respectively.

FIG. 2 shows a block diagram of a flow battery 3000 according to the second embodiment.

The flow battery 3000 according to the second embodiment comprises not only the elements included in the flow battery 1000 according to the first embodiment but also the following elements.

The flow battery 3000 according to the second embodiment further comprises the second liquid 120, the second electrode 220, and a second redox material 121.

The second redox material 121 is dissolved in the second liquid 120. The second liquid 120 contains a second non-aqueous solvent. In other words, it is desirable that the second liquid 120 is non-aqueous. However, unlike the first non-aqueous liquid 110, the second liquid 120 may be aqueous. It is desirable that the second liquid 120 is a liquid electrolyte, more desirably, a non-aqueous liquid electrolyte.

The second electrode 220 is in contact with the second liquid 120.

The lithium ion conductive film 400 separates the first electrode 210 and the second electrode 220 from each other. Likewise, the lithium ion conductive film 400 separates the first non-aqueous liquid 110 and the second liquid 120 from each other.

The flow battery 3000 according to the second embodiment has a large charge capacity and maintains charge-discharge property for a long time.

In other words, without the swelling of the lithium ion conductive film 400, the lithium ions travel through the lithium ion conductive film 400 between the first non-aqueous liquid 110 and the second liquid 120, both of which are in contact with the lithium ion conductive film 400.

In this way, the range of the choice of the first non-aqueous liquid 110, the first redox material 111 dissolved in the first non-aqueous liquid 110, the second liquid 120, and the second redox material 121 is expanded. Accordingly, the control range of the charge potential and the discharge potential is expanded to increase the charge capacity. Furthermore, even if the composition of the first non-aqueous liquid 110 is different from the composition of the second liquid 120, the charge-discharge property of the flow battery 3000 is maintained for a long time, since the first non-aqueous liquid 110 and the second liquid 120 are separated from each other with the lithium ion conductive film 400.

In the flow battery 3000 according to the second embodiment, the second liquid 120 may contain a compound having either a carbonate group or an ether bond as a non-aqueous solvent, similarly to the first non-aqueous liquid 110. The solvent of the second liquid 120 may be the same as or different from the solvent of the first non-aqueous liquid 110.

In the flow battery 3000 according to the second embodiment, the second redox material 121 is dissolved in the second liquid 120 and is oxidized or reduced electrochemically. In particular, the second redox material 121 may be a material listed above as the first redox material 111. A compound having a lower potential is selected as one of the first redox material 111 or the second redox material 121, and a compound having a higher potential is selected as the other. The first redox material 111 is different from the second redox material 121.

Third Embodiment

Hereinafter, the third embodiment of the present disclosure will be described. The matters which have already been set forth in the first embodiment and the second embodiment will be omitted appropriately.

Figure 3:
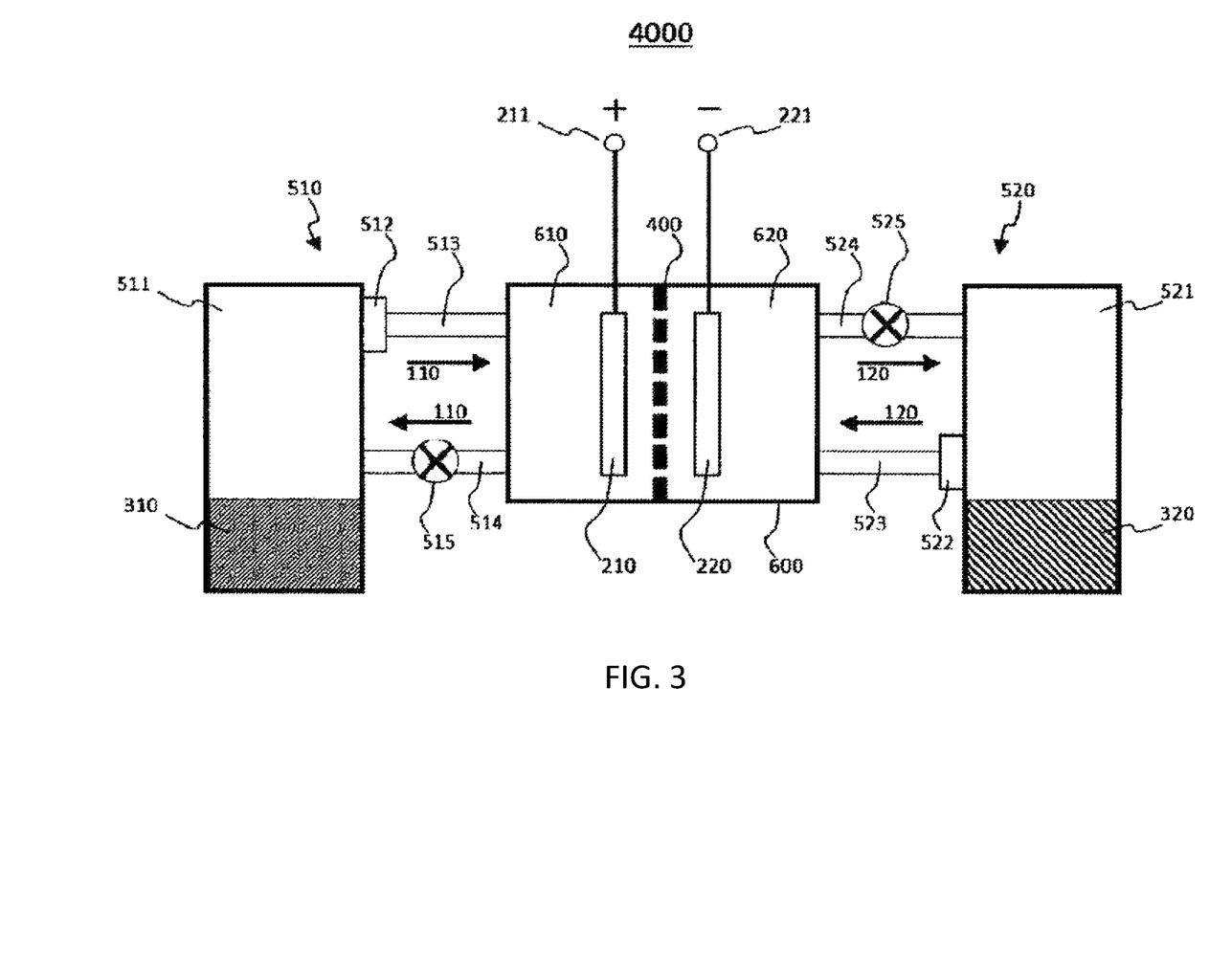
FIG. 3 shows a schematic view of a flow battery according to the third embodiment.

FIG. 3 shows a schematic view of a flow battery 4000 according to the third embodiment.

The flow battery 4000 according to the third embodiment comprises not only the elements included in the flow battery 3000 according to the second embodiment but also the following elements.

The flow battery 4000 according to the third embodiment comprises a first circulation mechanism 510.

The first circulation mechanism 510 circulates the first non-aqueous liquid 110 between the first electrode 210 and a first active material 310.

The first circulation mechanism 510 comprises a first container 511.

The first active material 310 and the first non-aqueous liquid 110 are contained in the first container 511.

The first active material 310 and the first non-aqueous liquid 110 are brought into contact with each other in the first container 511. As a result, the first redox material 111 is oxidized or reduced with the first active material 310. The first redox material 111 serves as a first electrode mediator.

In the first container 511, the first non-aqueous liquid 110 and the first active material 310 are brought into contact with each other.

An example of the first container 511 is a tank.

As shown in FIG. 3, the flow battery 4000 according to the third embodiment further may comprise an electrochemical reaction part 600, a cathode terminal 211, and an anode terminal 221.

The electrochemical reaction part 600 comprises a cathode chamber 610 and an anode chamber 620 in the inside thereof. In the electrochemical reaction part 600, the cathode chamber 610 and the anode chamber 620 are separated from each other with the lithium ion conductive film 400.

The cathode chamber 610 is provided with an electrode which serves as a cathode. In FIG. 3, the first electrode 210 is disposed in the cathode chamber 610.

The cathode terminal 211 is connected with the electrode which serves as the cathode. In FIG. 3, the cathode terminal 211 is connected with the first electrode 210.

The anode chamber 620 is provided with an electrode which serves as an anode. In FIG. 3, the second electrode 220 is disposed in the anode chamber 620.

The anode terminal 221 is connected with the electrode which serves as the anode. In FIG. 3, the anode terminal 221 is connected with the second electrode 220.

The cathode terminal 211 and the anode terminal 221 may be connected with a charge device or an external load. A voltage is applied between the cathode terminal 211 and the anode terminal 221 with the charge device. When the flow battery 1000 is connected with the external load, electric power is taken out from the cathode terminal 211 and the anode terminal 221.

As shown in FIG. 3, in the flow battery 4000 according to the third embodiment, the first circulation mechanism 510 may comprise a pipe 513, a pipe 514, and a pump 515. To distinguish the pipes from each other, the pipe 513 and the pipe 514 may be referred to as a first pipe 513 and a second pipe 514.

One end of the pipe 513 is connected to an outlet of the first non-aqueous liquid 110 of the first container 511.

The other end of the pipe 513 is connected to the cathode chamber 610.

One end of the pipe 514 is connected to the cathode chamber 610.

The other end of the pipe 514 is connected to an inlet of the first non-aqueous liquid 110 of the first container 511.

The pipe 514 is provided with the pump 515. The pipe 513 may be provided with the pump 515.

In the flow battery 4000 according to the third embodiment, the first circulation mechanism 510 may comprise a first filter 512.

The first filter 512 prevents the first active material 310 from traveling therethrough.

A flow path through which the first non-aqueous liquid 110 flows out of the first container 511 to the first electrode 210 is provided with the first filter 512. In FIG. 3, the pipe 513 is provided with the first filter 512.

The first filter 512 prevents the first active material 310 from flowing to the outside of the first container 511 (for example, to the cathode chamber 610). In other words, the first active material 310 remains in the first container 511. In this way, the first active material 310 is not circulated. For this reason, the inside of the element(s) included in the first circulation mechanism 510 (e.g., the inside of the pipe 513) is prevented from being clogged with the first active material 310. In addition, resistance loss generated due to the flow of the first active material 310 to the cathode chamber 610 is prevented from being generated.

A joint part of the first container 511 and the pipe 513 may be provided with the first filter 512.

The first filter 512 may have a hole which is smaller than the minimum particle size of particles of the first active material 310. The first filter 512 may be formed of a material which reacts with neither the first active material 310 nor the first non-aqueous liquid 110. An example of the material of the first filter 512 is a glass fiber filter paper, a polypropylene non-woven fabric, a polyethylene non-woven fabric, a polyethylene separator, a polypropylene separator, a polyimide separator, a two-layer structure separator of polyethylene/polypropylene, a three-layer structure separator of polypropylene/polyethylene/polypropylene, or a metal mesh which does not react with a lithium metal.

The first filter 512 prevents the first active material 310 from flowing out of the first container 511, even if not only the first non-aqueous liquid 110 but also the first active material 310 flows in the first container 511.

In FIG. 3, the first non-aqueous liquid 110 contained in the first container 511 is supplied to the cathode chamber 610 through the first filter 512 and the pipe 513.

The first redox material 111 which is dissolved in the first non-aqueous liquid 110 is oxidized or reduced on the first electrode 210.

Subsequently, the first non-aqueous liquid 110 in which the oxidized or reduced first redox material 111 is dissolved is supplied to the first container 511 through the pipe 514 and the pump 515.

The first redox material 111 dissolved in the first non-aqueous liquid 110 is oxidized or reduced with the first active material 310.

The circulation of the first non-aqueous liquid 110 is controlled with the pump 515. In other words, the supply of the first non-aqueous liquid 110 is started or stopped appropriately with the pump 515. The supplied amount of the first non-aqueous liquid 110 is controlled with the pump 515.

A valve may be used in place of the pump 515.

In FIG. 3, as one example, the first electrode 210 is a cathode and the second electrode 220 is an anode.

If an electrode having a relatively high electric potential is used as the second electrode 220, the first electrode 210 may be an anode.

In other words, the first electrode 210 may be an anode and the second electrode 220 may be a cathode.

The composition of the solvent of the first non-aqueous liquid 110 may be the same or different from the composition of the solvent of the second liquid 120. On the other hand, the first redox material 111 is different from the second redox material 121.

The flow battery 4000 according to the third embodiment further comprises a second circulation mechanism 520.

The second circulation mechanism 520 circulates the second liquid 120 between the second electrode 220 and a second active material 320.

The second circulation mechanism 520 comprises a second container 521.

The second active material 320 and the second liquid 120 are contained in the second container 521.

The second active material 320 and the second liquid 120 are brought into contact with each other in the second container 521. As a result, the second redox material 121 (i.e., a second electrode mediator) is oxidized or reduced with the second active material 320. The second redox material 121 serves as the second electrode mediator.

An example of the second container 521 is a tank.

As shown in FIG. 3, in the flow battery 4000 according to the third embodiment, the second circulation mechanism 520 may comprise a pipe 523, a pipe 524, and a pump 525. To distinguish the pipes from each other, the pipe 523 and the pipe 524 may be referred to as a third pipe 523 and a fourth pipe 524.

One end of the pipe 523 is connected to an outlet of the second liquid 120 of the second container 521.

The other end of the pipe 523 is connected to the anode chamber 620.

One end of the pipe 524 is connected to the anode chamber 620.

The other end of the pipe 524 is connected to an inlet of the second liquid 120 of the second container 521.

The pipe 524 is provided with the pump 525. The pipe 523 may be provided with the pump 525.

In the flow battery 4000 according to the third embodiment, the second circulation mechanism 520 may comprise a second filter 522.

The second filter 522 prevents the second active material 320 from traveling therethrough.

A flow path through which the second liquid 120 flows out of the second container 521 to the second electrode 220 is provided with the second filter 522. In FIG. 3, the pipe 523 is provided with the second filter 522.

The second filter 522 prevents the second active material 320 from flowing to the outside of the second container 521 (for example, to the anode chamber 620). In other words, the second active material 320 remains in the second container 521. In this way, the second active material 320 is not circulated. For this reason, the inside of the element(s) included in the second circulation mechanism 520 (e.g., the inside of the pipe 523) is prevented from being clogged with the second active material 320. In addition, resistance loss generated due to the flow of the second active material 320 to the anode chamber 620 is prevented from being generated.

A joint part of the second container 521 and the pipe 523 may be provided with the second filter 522.

The second filter 522 may have a hole which is smaller than the minimum particle size of particles of the second active material 320. The second filter 522 may be formed of a material which reacts with neither the second active material 320 nor the second liquid 120. An example of the material of the filter is a glass fiber filter paper, a polypropylene non-woven fabric, a polyethylene non-woven fabric, or a metal mesh which does not react with a lithium metal.

The second filter 522 prevents the second active material 320 from flowing out of the second container 521, even if not only the second liquid 120 but also the second active material 320 flows in the second container 521.

In FIG. 3, the second liquid 120 contained in the second container 521 is supplied to the anode chamber 620 through the second filter 522 and the pipe 523.

The second redox material 121 which is dissolved in the second liquid 120 is oxidized or reduced on the second electrode 220.

Subsequently, the second liquid 120 in which the oxidized or reduced second redox material 121 is dissolved is supplied to the second container 521 through the pipe 524 and the pump 525.

The second redox material 121 dissolved in the second liquid 120 is oxidized or reduced with the second active material 320.

The circulation of the second liquid 120 may be controlled with the pump 525. In other words, the supply of the second liquid 120 is started or stopped appropriately with the pump 525. The supplied amount of the second liquid 120 is controlled with the pump 525.

A valve may be used in place of the pump 525.

In FIG. 3, as one example, the first electrode 210 is a cathode and the second electrode 220 is an anode.

If an electrode having a relatively low electric potential is used as the first electrode 210, the second electrode 220 may be a cathode.

In other words, the second electrode 220 may be an anode and the first electrode 210 may be a cathode.

The matters set forth in the first to third embodiments may be combined appropriately with each other.

EXAMPLES

Hereinafter, the present disclosure will be described in more detail with reference to the following examples.

The sulfonated dichlorodiphenyl sulfone used in the present examples has the following chemical structure.

[Chem. 5]

(Synthesis of Aromatic Polymer SPES 50)

The reagents listed below were added to N-methyl-2-pyrrolidone (45 milliliters, hereinafter, referred to as "NMP") to prepare an NMP solution.

Sulfonated dichlorodiphenyl sulfone (5.10 grams, 10.4 mmol)

4,4'-biphenol (1.94 grams, 10.4 mmol), and

Potassium carbonate (2.61 grams, 18.9 mmol).

The NMP solution was poured into a 3-necked flask comprising a mechanical stirrer and a Dean-Stark apparatus which had a condenser on the upper part thereof. A $N_2$ gas was supplied continuously through the surplus neck of the 3-necked flask to the inside of the 3-necked flask.

Next, while the NMP solution was stirred, the NMP solution was heated at a nitrogen atmosphere for three hours at temperature of 135 degrees Celsius to provide a mixture solution.

Toluene (15 milliliters) was added to the thus-provided mixture solution.

Next, the mixture solution was stirred at 150 degrees Celsius to perform an azeotropic treatment with the Dean- Stark apparatus. Since dehydration condensation reaction of sulfonated dichlorodiphenyl sulfone and 4,4'-biphenol with potassium carbonate is an equilibrium reaction, the dehydration condensation reaction proceeded, while the equilibrium is displaced with the azeotropic treatment. While sulfonated dichlorodiphenyl sulfone and 4,4'-biphenol were polymerized in this way, the mixture solution was heated at 185 degrees Celsius for 12 hours to provide a polymerization solution.

The provided polymerization solution was cooled to room temperature, and then, filtrated. Redundant potassium carbonate was precipitated in the polymerization solution as a solid due to the cooling. The precipitated solid potassium carbonate was removed with a filter to provide a filtrate.

Redundant sulfonated dichlorodiphenyl sulfone and 4,4'-biphenol were removed with a dialysis membrane from the provided filtrate to purify the filtrate. NMP was removed with an evaporator from the purified filtrate. In this way, an aromatic polymer SPES 50 represented by the following chemical formula was provided.

[Chem. 6]

(Synthesis of Aromatic Polymer SPES 100)

The aromatic polymer SPES 50 (1.5 grams) was added to sulfuric acid (concentration: 98%, 50 milliliters) to provide a sulfuric acid solution.

While the sulfuric acid solution was stirred, the sulfuric acid solution was heated for 5 days at 70 degrees Celsius.

Next, after the sulfuric acid solution was left at rest to cool to room temperature, the sulfuric acid solution was mixed with ice-cold water. Due to the mixing, the phenyl group (namely, the phenyl group included in a part derived from the 4,4'-biphenol included in the backbone of the aromatic polymer SPES 50) reacted with sulfuric acid to substitute the hydrogen atom of the phenyl group with the sulfo group (i.e., —$SO_3H$). In this way, a reaction solution was provided.

The reaction solution was purified with a dialysis membrane, and then, water contained in the reaction solution was removed with an evaporator to provide an aromatic polymer SPES 100 represented by the following chemical formula.

[Chem. 7]

The aromatic polymer SPES 100 does not have a cross-linking structure. The aromatic polymer SPES 100 includes an aromatic ring having a sulfonate group in the main chain thereof.

Inventive Example 1

The aromatic polymer SPES 100 (0.066 grams) was added to dimethyl sulfoxide (0.66 grams, specific gravity, 1.1 g/cm$^3$, hereinafter, referred to as "DMSO") to provide a mixture solution.

While the mixture solution was stirred, the mixture solution was heated at 50 degrees Celsius to prepare a homogenous application solution having a concentration of aromatic polymer SPES 100 of 10 weight percent. Hereinafter, the homogenous application solution is referred to as a SPES 100 application solution.

A non-woven fabric (product of Hirose Paper Mfg Co. Ltd., trade name: PS0010S, size: 40 millimeters×40 millimeters×19 micrometers) was impregnated with the SPES 100 application solution (0.6 milliliters). The non-woven fabric was formed of polyphenylene sulfide and was used as the polymer base material.

The non-woven fabric was left at rest under a vacuum at 80 degrees Celsius for 12 hours to remove the DMSO.

Then, the non-woven fabric was heated for 8 hours on a hot plate maintained at 200 degrees Celsius to provide an ionic polymer composite.

The ionic polymer composite was immersed in a lithium hydroxide aqueous solution having a concentration of 1 mol/L to perform ion exchange treatment.

The ionic polymer composite was washed with water to provide a brown-black lithium ion conductive film 400. The following chemical formula (I) shows a chemical structure of an ionic polymer CL-SPES100 contained in the lithium ion conductive film 400 provided in the inventive example 1.

(Chemical formula (I))

[Chem. 8]

where n1 and n2 are, each independently, natural numbers of not less than 1.

Figure 4:
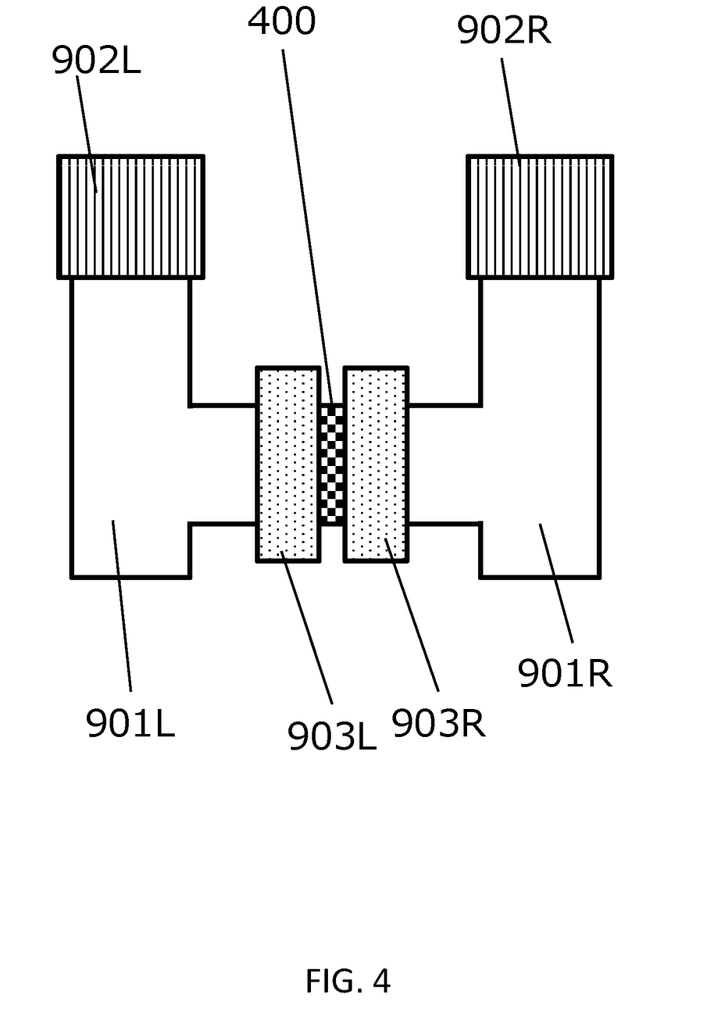
FIG. 4 shows a schematic view of a glass cell used for the swelling test in the examples.

Electric conductivity of the lithium ion conductive film 400 according to the inventive example 1 was measured as below. The lithium ion conductive film 400 was interposed between two copper films. Then, using two glass slides, a stacking structure of the glass slide/the copper film/the lithium ion conductive film 400/the copper film/the glass slide was provided. Alternate current impedance of the lithium ion conductive film 400 was measured with an electric chemical measurement system (product of Solartron Analytical Ltd., Frequency Response Analyzer 1255B and MultiStat 1470E, frequency range: 1 MHz-0.01 Hz, amplitude: 10 mA). The electric conductivity of the lithium ion conductive film 400 was calculated on the basis of the spectrum of the measured alternate current impedance. As a result, the lithium ion conductive film 400 according to the inventive example 1 had electric conductivity of $1.6 \times 10^{-5}$ S/cm The lithium ion conductive film 400 according to the inventive example 1 was subjected to a swelling test as below. FIG. 4 shows a schematic view of a glass cell used for the swelling test. As shown in FIG. 4, the glass cell comprised a left chamber 901L, a right chamber 901R, a left lid 902L, a right lid 902R, a left fixture 903L, and a right fixture 903R. The lithium ion conductive film 400 according to the inventive example 1 was interposed between the two fixtures 903L and 903R. Subsequently, a mixture liquid of triglyme and 2-methyltetrahydrofuran having a volume ratio of triglyme: 2-methyltetrahydrofuran of 3:7 was supplied to the left chamber 901L, and then, the lithium ion conductive film 400 according to the inventive example 1 was left at rest. The lithium ion conductive film 400 according to the inventive example 1 was neither dissolved nor swelled. In other words, the shape of the lithium ion conductive film 400 according to the inventive example 1 was maintained. The lithium ion conductive film 400 according to the inventive example 1 had appropriate flexibility. No crack was observed on the lithium ion conductive film 400 according to the inventive example 1.

Inventive Example 2

In the inventive example 2, the lithium ion conductive film 400 was provided similarly to the case of the inventive example 1, except the following matters.

(i) Pyromellitic dianhydride/4,4'-oxydianiline polyimide porous film (20 millimeters x 20 millimeters x 40 micrometers) was used as the polymer base material in place of the non-woven fabric.

(ii) the polyimide porous film was heated under a vacuum from 80 degrees Celsius to 200 degrees Celsius, instead of heating the non-woven fabric for 8 hours on a hot plate maintained at 200 degrees Celsius, to provide an ionic polymer composite (temperature rising rate: 0.5 degrees Celsius/minute, maintenance at 200 degrees Celsius: 40 hours).

Similarly to the case of the inventive example 1, the lithium ion conductive film 400 according to the inventive example 2 was also neither dissolved nor swelled even when in contact with the mixture liquid of triglyme and 2-methyltetrahydrofuran. The lithium ion conductive film 400 according to the inventive example 2 also had appropriate flexibility. No crack was also observed on the lithium ion conductive film 400 according to the inventive example 2.

Comparative Example 1

The SPES 100 application solution was applied on a glass substrate, and then, dried to remove the solvent (namely, DMSO). In this way, a colorless and transparent polymer film SPES 100 was provided. Then, the colorless and transparent polymer film SPES 100 was peeled from the glass substrate. When the lithium ion conductive film according to the comparative example 1 was brought into contact with the mixture liquid of triglyme and 2-methyltetrahydrofuran, the lithium ion conductive film was swelled. Furthermore, leakage of the solvent was observed in the right chamber 901R.

INDUSTRIAL APPLICABILITY

The flow battery according to the present disclosure can be used suitable for an electric storage device or an electric storage system.

REFERENTIAL SIGNS LIST

110 first non-aqueous liquid
111 first redox material
120 second liquid
121 second redox material
210 first electrode
211 cathode terminal
220 second electrode
221 anode terminal
310 first active material
320 second active material
400 lithium ion conductive film
510 first circulation mechanism
511 first container
512 first filter
513, 514, 523, 524 pipe
515, 525 pump
520 second circulation mechanism
521 second container
522 second filter
600 electrochemical reaction part
610 cathode chamber
620 anode chamber
1000, 3000, 4000 flow battery

The invention claimed is:

1. A flow battery, comprising:
   a first non-aqueous liquid;
   a first electrode in contact with the first non-aqueous liquid;
   a second electrode which serves as a counter electrode of the first electrode; and
   a lithium ion conductive film which separates the first electrode and the second electrode from each other,
   wherein
   the lithium ion conductive film is formed of a polymer base material containing an ionic polymer;
   the polymer base material has an interspace which communicates with an outside thereof;
   the polymer base material is formed of at least one kind of resin selected from the group consisting of a thermosetting resin and a thermoplastic resin which has a melting point of not less than 150 degrees Celsius;
   the ionic polymer is contained in an inside of the interspace of the polymer base material; and the ionic polymer is represented by where n1 and n2 are, each independently, natural numbers of not less than 1, or where m1, m2, n1, and n2 are, each independently, natural numbers of not less than 1.

2. The flow battery according to claim 1, wherein the thermoplastic resin which has a melting point of not less than 150 degrees Celsius is at least one selected from the group consisting of polyphenylene sulfide and a liquid crystal polymer.

3. The flow battery according to claim 1, wherein the thermosetting resin is aromatic polyimide which does not have a fluorine atom.

4. The flow battery according to claim 1, wherein the polymer base material is at least one kind of a base material selected from the group consisting of a porous film, a non-woven fabric, and a mesh.

5. The flow battery according to claim 1, wherein the first non-aqueous liquid contains, as a solvent, a compound having at least one selected from the group consisting of a carbonate group or an ether bond.

6. The flow battery according to claim 1, wherein the first non-aqueous liquid contains, as a solvent, at least one selected from the group consisting of propylene carbonate, ethylene carbonate, dimethyl carbonate, ethyl methyl carbonate, and diethyl carbonate.

7. The flow battery according to claim 1, wherein the first non-aqueous liquid contains, as a solvent, at least one selected from the group consisting of dimethoxyethane, dibutoxyethane, diglyme, triglyme, tetraglyme, tetrahydrofuran, 2-methyltetrahydrofuran, 2,5-dimethyltetrahydrofuran, 1,3-dioxolane, and 4-methyl-1,3-dioxolane.

8. The flow battery according to claim 1, further comprising:
a first redox material;
a first active material; and
a first circulation mechanism capable of circulating the first non-aqueous liquid between the first electrode and the first active material;
wherein
the first non-aqueous liquid contains the first redox material;
the first active material is insoluble in the first liquid;
the first redox material is oxidized or reduced on the first electrode; and
the first redox material is oxidized or reduced with the first active material.

9. The flow battery according to claim 8, further comprising:
a second liquid;
a second redox material;
a second active material; and
a second circulation mechanism capable of circulating the second liquid between the second electrode and the second active material;
wherein
the second liquid contains the second redox material;
the second active material is insoluble in the second liquid;
the second electrode is in contact with the second liquid;
the second redox material is oxidized or reduced on the second electrode; and
the second redox material is oxidized or reduced with the second active material.

* * * * *